United States Patent
Moon et al.

(10) Patent No.: US 9,891,969 B2
(45) Date of Patent: Feb. 13, 2018

(54) METHOD AND APPARATUS FOR DEVICE STATE BASED ENCRYPTION KEY

(71) Applicant: Samsung Electronics Co., Ltd., Suwon-si, Gyeonggi-do (KR)

(72) Inventors: Kwanghwan Moon, Mountain View, CA (US); Peng Ning, Mountain View, CA (US); Geng Chen, Mountain View, CA (US); Sangwoo Ryu, Mountain View, CA (US); S J Oh, Mountain View, CA (US); Sami Orava, Mountain View, CA (US); KyungBae Park, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/054,699

(22) Filed: Feb. 26, 2016

(65) Prior Publication Data

US 2016/0253520 A1    Sep. 1, 2016

Related U.S. Application Data

(60) Provisional application No. 62/126,055, filed on Feb. 27, 2015.

(51) Int. Cl.
| | | |
|---|---|---|
| *G06F 9/54* | (2006.01) | |
| *G06F 21/72* | (2013.01) | |
| *G06F 21/44* | (2013.01) | |
| *H04L 9/08* | (2006.01) | |
| *G06F 21/60* | (2013.01) | |
| *G06F 21/62* | (2013.01) | |
| *G06F 21/73* | (2013.01) | |

(52) U.S. Cl.
CPC .............. *G06F 9/545* (2013.01); *G06F 21/44* (2013.01); *G06F 21/602* (2013.01); *G06F 21/6281* (2013.01); *G06F 21/72* (2013.01); *G06F 21/73* (2013.01); *H04L 9/0819* (2013.01)

(58) Field of Classification Search
CPC .......... G06F 21/44; G06F 21/72; G06F 21/73; G06F 21/602; G06F 21/6281; G06F 9/545; G06F 9/0819
See application file for complete search history.

(56) References Cited

U.S. PATENT DOCUMENTS

| | | | |
|---|---|---|---|
| 8,572,389 B2 | 10/2013 | Little | |
| 8,984,294 B2* | 3/2015 | Nagai | H04L 9/0877 380/228 |
| 9,639,710 B2* | 5/2017 | Cooley | G06F 21/6218 |
| 9,680,805 B1* | 6/2017 | Rodgers | H04L 63/061 |

(Continued)

*Primary Examiner* — Beemnet Dada
(74) *Attorney, Agent, or Firm* — Jefferson IP Law, LLP

(57) ABSTRACT

An apparatus and a method for encrypting and decrypting data in a device are provided. The apparatus includes a processor and a memory. The processor is configured to transmit a data command from an application to an encryption driver that executes in a kernel space, determine if the application is authenticated to perform the data command based on an access policy, transmit, when the application is authenticated, a first key to a cryptographic library that executes in an application space, and perform the data command based on the first key after receiving a response via the cryptographic library. The first key is stored in an encryption driver in the kernel space and is not available to applications in the application space.

18 Claims, 6 Drawing Sheets

(56) References Cited

U.S. PATENT DOCUMENTS

2016/0048460 A1\* 2/2016 Kadi .................. G06F 12/1408
                                                        713/193
2017/0124337 A1\* 5/2017 Li ........................ G06F 3/0623

\* cited by examiner

METHOD AND APPARATUS FOR DEVICE STATE BASED ENCRYPTION KEY

CROSS-REFERENCE TO RELATED APPLICATION(S)

This application claims the benefit under 35 U.S.C. § 119(e) of a U.S. Provisional application filed on Feb. 27, 2015, in the U.S. Patent and Trademark Office and assigned Ser. No. 62/126,055, the entire disclosure of which is hereby incorporated by reference.

BACKGROUND

Mobile devices are an important aspect of modern life and may include extremely sensitive data such as passwords, location information, credit card information, bank information, and so forth. Accordingly, many mobile devices are beginning to implement file system encryption to prevent unauthorized access to the contents within the mobile device to protect the user's private information.

TECHNICAL FIELD

The present disclosure relates to generating encryption keys in a mobile device. More particularly, the present disclosure relates to a method and apparatus for a device state based encryption key.

SUMMARY

Aspects of the present disclosure are to address at least the above-mentioned problems and/or disadvantages and to provide at least the advantages described below. Accordingly, an aspect of the present disclosure is to provide an apparatus and method for a device state based encryption key.

In accordance with an aspect of the present disclosure, a method for encrypting and decrypting data in a device is provided. The method includes transmitting a data command from an application to an encryption driver that executes in a kernel space, determining if the application is authenticated to perform the data command based on an access policy, transmitting, when the application is authenticated, a first key to a cryptographic library that executes in an application space; and performing the data command based on the first key after receiving a response from a response via the cryptographic library.

In accordance with an aspect of the present disclosure, an apparatus for encrypting content is provided. The apparatus includes a memory and a processor. The processor is configured to transmit a data command from an application to an encryption driver that executes in a kernel space, determine if the application is authenticated to perform the data command based on an access policy, transmit, when the application is authenticated, a first key to a cryptographic library that executes in an application space, and perform the data command based on the first key after receiving a response via the cryptographic library.

A non-transitory computer-readable storage medium storing instructions is also disclosed. When the instructions, when executed, cause at least one processor to transmit a data command from an application to an encryption driver that executes in a kernel space, determine if the application is authenticated to perform the data command based on an access policy, transmit, when the application is authenticated, a first key to a cryptographic library that executes in an application space, and perform the data command based on the first key after receiving a response via the cryptographic library.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
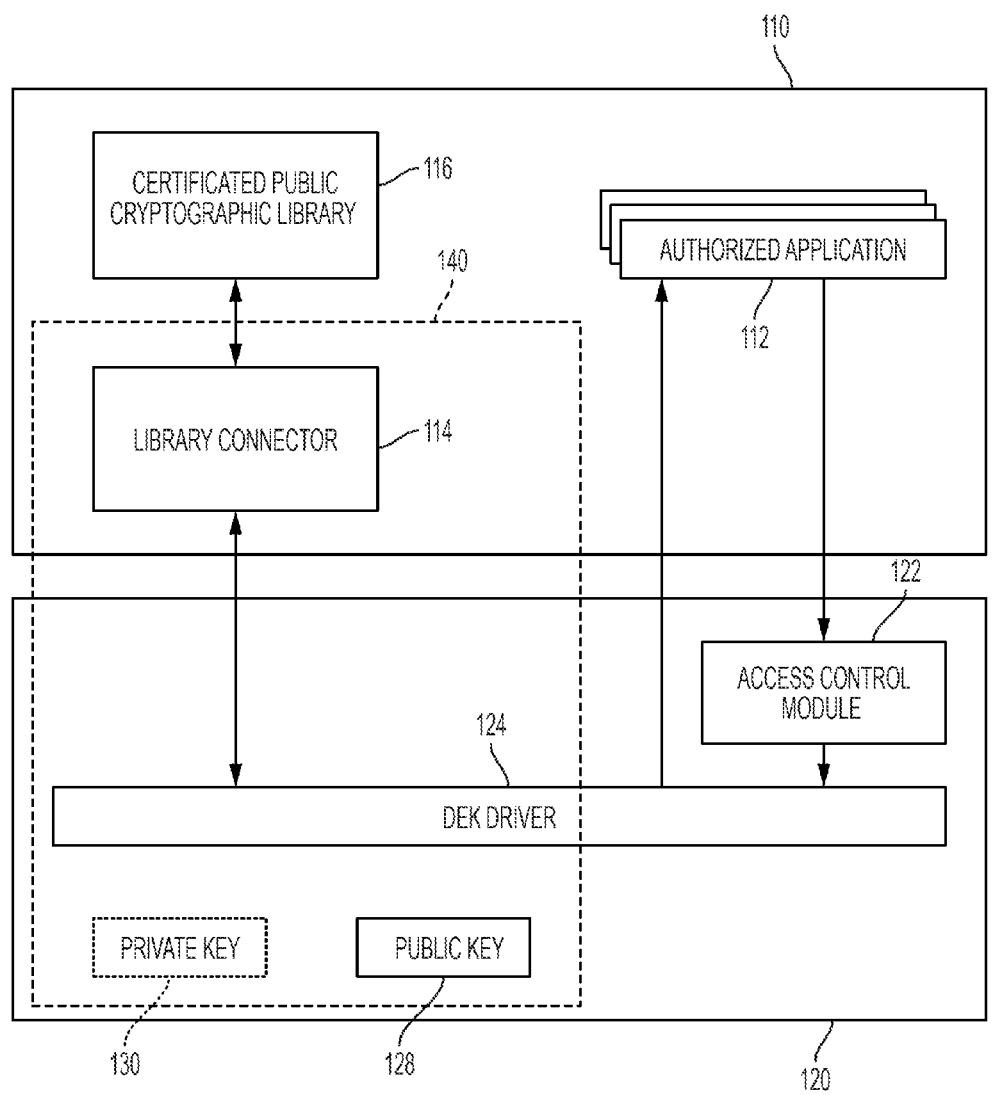
FIG. 1 is a block diagram of a system for encrypting and decrypting protected data according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Numeric terms such as first, second, and the like are used to differentiate between similar objects and are in no way intended to represent a chronological order, unless where explicitly stated otherwise. A set is defined as a non-empty set including at least one element.

In a mobile device, the mobile device may include various spaces for different operations. For example, a mobile device may include a normal user space and a protected space. The normal user space provides normal operations for the user (e.g., personal use) and the protected space is separate to provide more secure operations that may need to have different security requirements (e.g., encryption, access restrictions, etc.). The protected spaces may be in a locked state when a user is actively using the device and may be unlocked by providing access information (e.g., a password, biometric information, etc.). In some examples, the protected spaces are implemented via a security module associated with the device such as Samsung Knox®.

Further, various data within the protected space in the device may need to be updated asynchronously and kept in a secure state (e.g., a locked state). In particular, different types of data may require different security approaches. For example, some applications may need to read and write data while the mobile device is locked in a secure state. Other types of applications may require further security and may enable write commands while the protected spaced is placed in locked state, but may prevent read commands from occurring in the locked state. Further, the data may itself be different (e.g., files within the file system, tables within a database, etc.).

As used herein, protected data refers to data that allows read and write commands while in a locked state and sensitive data refers to data that allows write commands in the locked state and disallows read commands in the locked state. Read commands for sensitive data are available during the unlocked state because a user has provided authentication that is used to generate a private key to read encrypted data. Thus, sensitive data cannot be decrypted during a locked state when the private key is discarded while transitioning to the locked state and both sensitive data and protected data cannot be decrypted while the device is turned off.

FIG. 1 is a block diagram of a system for encrypting and decrypting protected data according to an embodiment of the present disclosure.

Referring to FIG. 1, an operating system implements an application space 110 and a kernel space 120. The kernel space 120 contains the underlying memory space, modules, and other components that enable the system to interact with hardware and software components. For example, the kernel space 120 includes drivers that enable hardware components to be used by the other components of the operating system. The application space 110 enables various applications to use various resources such as application programming interfaces (API), middleware, interpreters, etc. Generally, the application space 110 and the kernel space 120 are separate memory spaces and applications that execute within these spaces do not have access to each other's components for security and stability reasons. The kernel 110 may expose functional parts to enable the system to access system level resources through various interfaces such as a video driver, a network driver, an access control module, etc. These resources exposed in the kernel space 110 are secured and prevent applications in the application space 110 from accessing the memory contents of the kernel space 110.

The application space 110 may include an authorized application 112, a library connector 114, and a certificated public cryptographic library 116. The kernel space 120 includes an access control module 122 and a device encryption key (DEK) driver 124. The kernel space 120 may also contain a public key 128 and a private key 130, which are associated with the certificated public cryptographic library 116. The public key 128 and the private key 130 may also be stored together or separately in different areas based on security requirements. For example, the public key 128 may be stored as a plain text in a portion of a volatile memory allocated to the kernel space 120 and the private key 130, which may be generated when the user unlocks the device, is stored in the portion of the volatile memory allocated to the kernel space 120. The library connector 114, portions of the DEK driver 124, the public key 128, and the private key 130 are disposed in a protected space 140 that is not directly available to the authorized application 112. In other examples, other modules that execute in the kernel space 120 may access the protected space 140 without the access control module 122.

The protected space 140 may be in a locked state or an unlocked state that is separate from the locked or unlocked state of the device. That is, the protected space 140 may require a separate authentication to unlock the protected space 140. The protected space 140 may be configured to enter the locked state when the device also enters the locked state, but the protected space 140 may also enter the locked state separately from the device's locked state.

When the protected space 140 is in the unlocked state, the authorized application 112 may transmit a data command to the DEK driver 124 to access the protected space 140 via the access control module 122. In particular, the authorized application 112 may need to access the DEK driver 124 to encrypt or decrypt data that is either protected or sensitive. In response, the access control module 122 determines if the authorized application 112 is authentic and has the necessary access privileges to perform the corresponding data command. For example, the access control module 122 may determine if the data command is provided in a whitelist that grants specific privileges in the protected space 140. Based on the organization's access policy and security requirements, the protected data and the sensitive data may have strict access and may restrict the authorized applications 112 to only a small subset of applications such as email, web browsing only on intranet servers, and so forth. Other organizations may have more lenient access policies and security requirements and may let more applications access the protected data.

The access control module 122 may also determine if the authorized application 112 has been compromised. For example, a cryptographic signature may be generated from the authorized application 112 and then compared to a cryptographic key to verify its authenticity. If the cryptographic signature and the cryptographic key do not match, then the authorized application 112 may have been tampered with and access privileges may be denied.

If the authorized application 112 has the required access privileges, the data command is forwarded to the DEK driver 124 in the kernel space 120. If the authorized application 112 does not have the required access level, the data command is canceled and an error message may be returned to the authorized application 112.

The DEK driver 124 is configured to receive the data command from the access control module 122 and either perform the corresponding data operation via the kernel space 120 or provide information to the authorized application 112 to enable the authorized application to perform the authorized application via the user space 110. In particular, the DEK driver 124 uses the public key 128 to read encrypted data and uses the private key 130 to write encrypted data. The DEK driver 124 may also be configured to provide information to the authorized application 112 to enable the authorized application 112 to perform the corresponding operation. For example, Table 1 below illustrates pseudocode for different write methods of writing data from an application.

TABLE 1

```
//Example 1
var ObjectToWrite = ReceiveDataFromSource( );
var encryptedKey = Kernelspace.GetEncryptedDekKey(ObjectToWrite);
var encryptedData = Kernelspace.Encrypt(ObjectToWrite, encryptedKey);
FileSystemWriter.WriteEncryptedData(encryptedData, encryptedKey);
//Example 2
var ObjectToWrite = ReceiveDataFromSource( );
KernelSpaceWriter.WriteEncryptedData(ObjectToWrite);
//Example 3
var ObjectToWrite = ReceiveDataFromSource( );
var plainKey = Kernelspace.GetDekKey( );
var encryptedKey = Kernelspace.GetEncryptedDekKey(plainKey);
var encryptedData = EncryptionLibrary.Encrypt(ObjectToWrite, plainKey);
FileSystemWriter.WriteEncryptedData(encryptedData, encryptedKey);
Discard(plainKey);
```

The DEK driver 124, having received the data command, is configured to access the library connector 114 to connect to the certificated public cryptographic library 116. In particular, the kernel space 120 generally does not provide access to external libraries in the application space 110. Accordingly, the DEK driver 124 implements a suitable interface to connect to the library connector 114, which interfaces with the certificated public cryptographic library 116. Thus, the DEK driver 124 can interface with the certificated public cryptographic library 116 to encrypt and decrypt data via the library connector 114. In another example, as illustrated above in FIG. 1, the DEK driver 124 may use the certificated public cryptographic library 116 to generate a DEK based on the data command and return the generated DEK and the DEK in encrypted form to the authorized application 112, which performs the reading and writing of the encrypted data based on the DEK.

As such, the DEK driver 124 is configured to provide access to cryptographic libraries within the kernel space 120 via the library connector 114. Encrypted modules in the application space 110 or the kernel space 120 may take two years to receive suitable certifications from the appropriate certification organization, which would prevent firmware and other updates to the device. As such, implementing a certified public cryptographic library 116 in the application space 110 that connects to the kernel space 120 via the connector library 114 precludes the need to receive separate certifications for kernel modules. Because the library connector 114 may only enable connections to the certificated public cryptographic library 116 from the kernel space 110, the library connector 114 may not require certification. However, it may be desirable to seek certification of the connector library from the appropriate certification organization for various reasons.

The DEK driver 124 generally uses the public key 128 to write protected data to the device (e.g., a file system, a database in the file system, etc.) and the private key 130 to read protected and sensitive data from the device. Thus, the DEK driver 124 selects the appropriate key, which may be different for each authorized application 112, to transmit to the public cryptographic library 116 based on the data operation. Further, different types of data may implement different key security policies. For example, when the protected space 140 is in a locked state and the data command is related to write protected data, the DEK driver 124 may use the public key 128 for writing the protected data. When the protected spaced 140 is in unlocked state and the data command in related to read protected data, the DEK driver 124 may use the private key 130 for reading the protected data. The private key 130 may be selectively stored in the protected space 140 based on whether the protected space 140 is in the locked state or unlocked state, thereby preventing the authorized application 112 from reading the protected data when the protected space 140 is in the locked state.

In another example, if the data command is related to sensitive data, the protected space 140 is configured to encrypt the sensitive data using the private key 130. However, the private key 130 may be generated based on another private key (not shown) that is combined with access information, which a user may input to unlock the protected space 140. The private key 130 may be stored when the protected space 140 is locked and, in response to transitioning from the unlocked state to the locked state, the protected space 140 may discard the private key 130, thereby preventing any read operations in the protected space 140.

Further, the authorized application 112 can write the encrypted data at any suitable location because the data is encrypted using the certificated cryptographic library 116 that should only be accessed via the DEK driver 124. However, in some examples, the kernel space 110 may store the encrypted data that is associated with the protected space 140 and provided an additional layer of encryption (e.g., when the device is powered down, contents of the protected space 140 may be encrypted for additional security measures, etc.).

Figure 2:
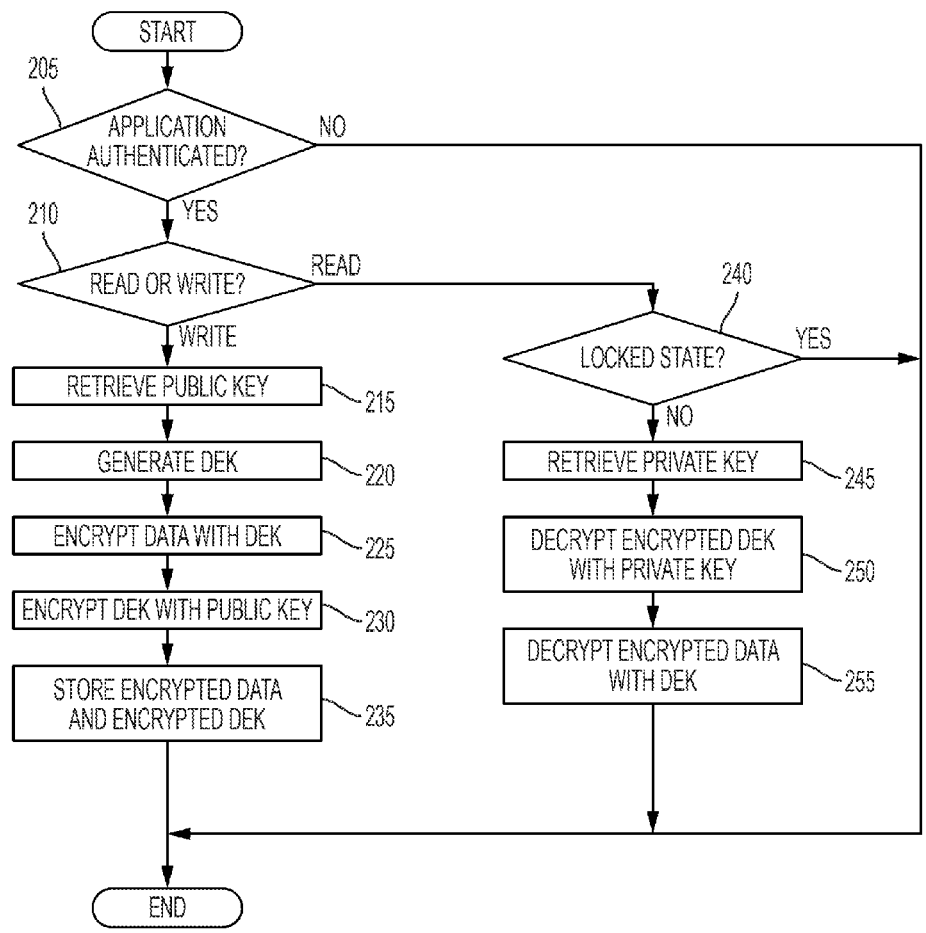
FIG. 2 is a flowchart of a method of performing data commands using an encryption driver according to an embodiment of the present disclosure.

FIG. 2 is a flowchart of a method of performing data command using an encryption driver according to an embodiment of the present disclosure.

Referring to FIG. 2, the method starts by receiving a data command related to protected data and determining if the application transmitting the file command is authorized in operation 205. If the application is not authenticated, the method ends because the application does not have required access privileges. If the application is authenticated, the method determines if the data command is a read command or a write command at operation 210. If the data command is a write command, the device retrieves a public key, which is based on the identity of the authorized application 112, at operation 215. The method then generates a DEK at operation 220, encrypts the data using the DEK at operation 225, encrypts the DEK with the public key at operation 230, and then stores the encrypted data and the encrypted DEK at operation 235. After storing the encrypted data, the data command ends.

Referring back to operation 210, if the data command is a read command, the method determines if the protected space is unlocked at operation 240. If the protected space is locked at operation 240, the data command ends. If the device is unlocked, the method retrieves the private key, which may be encrypted, at operation 245. The method decrypts the encrypted DEK with the private key at operation 250, decrypts the encrypted data using the DEK at operation 255, and the data command ends.

Figure 3:
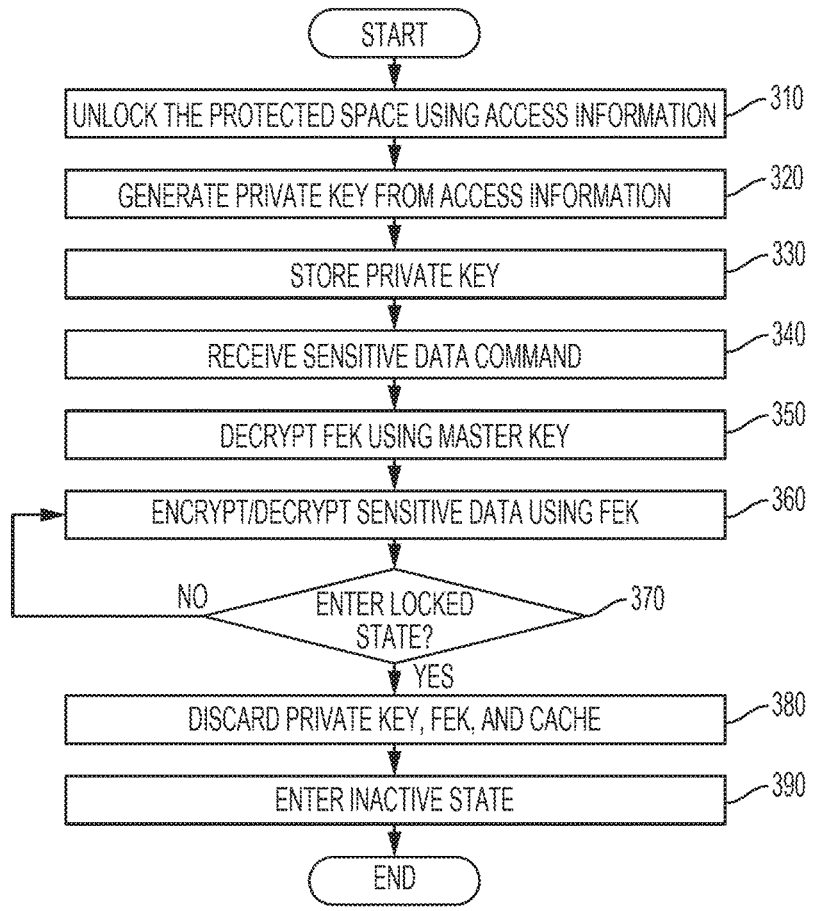
FIG. 3 is a flowchart of a method for encrypting and decrypting sensitive data according to an embodiment of the present disclosure.

FIG. 3 is a flowchart of a method of encrypting and decrypting sensitive data according to an embodiment of the present disclosure.

Referring to FIG. 3, a method of encrypting and decrypting sensitive data is illustrated. Although the description with respect to FIG. 3 refers to sensitive data, the sensitive data may be a file encrypted in the file system or may be data stored in an encrypted database in the file system. Initially, a user operates the device to unlock the protected space from a locked state to an unlocked state. In operation 310, the method presents a user interface that requires the user to input access information that is known or available to the user. For example, the information may be a password, biometric information (e.g., a fingerprint, an iris, etc.), and/or an external device having a unique access code (e.g., a radio frequency identifier (RFID) tag, a near field communication (NFC) tag, etc.).

After receiving the access information, the method generates a private key from the access information in operation 320. For example, the private key may be generated from a key derivation algorithm such as a password-based key derivation function 2 (PBKDF2) using a unique key associated with the hardware. In some examples, if the access information is based on biometric information, the information used to generate the key may be derived from the biometric information or information only available based on authentication using the biometric information.

After generating the private key in operation 320, the private key is stored while the protected space is maintained in the unlocked state in operation 330. The private key is stored in an encryption driver that operates in the kernel space such that the private key is unavailable to any applications in the application. That is, the access information may be generated and input into the kernel via a public interface. However, once that information is input, the private key is available in the kernel space and is not available in the application space. In some examples, after the private key is generated, the kernel may be configured to disable any public interface that may generate the private key.

In operation 340, the method receives a sensitive command, which is a command to read or write sensitive data. Accordingly, the device retrieves an encrypted file encryption key (FEK) of a specific application, which was encrypted using the private key, decrypts the encrypted FEK, and generates the FEK in operation 350. Although the FEK is provided for encrypting files for a specific application, the FEK may be also correspond to a DEK that is generated for a portion of content of that application. Thus, the kernel space may store the unencrypted FEKs of various applications such that the FEKs are in a protected memory space that cannot be accessed outside of the kernel space such as, for example, by middleware, an API, etc. In operation 350, if there is no sensitive data associated with the application, the FEK may be randomly generated using a cryptographic library. In operation 360, the sensitive data is encrypted or decrypted based on the data command (read, write, edit, etc.). As noted above in Table 1, because the private key and the unencrypted FEKs are stored in the kernel space, the applications may provide a request to the kernel to perform the file operation without any knowledge of any encryption.

In operation 370, the device determines if a locked state is entered due to a user input or a lapse in use (i.e., inactivity) of the device. If the device does not enter the locked state, the method returns to operation 360 such that the device can continue to access sensitive data. If the device does enter the locked state at operation 370, the device discards the private key, the FEK, and any cache items related to the private key in operation 380.

In operation 390, the protected space enters the locked state. Accordingly, because all items related to the private key have been discarded and the private key can be retrieved when the user inputs the access information, it is not possible to regenerate the private key. As such, while the protected space is in the locked state after operation 380, the sensitive data cannot be accessed or modified.

An application generally provides a kernel call to perform the necessary data command using a file system driver. In this case, the FEK and other information is stored in the kernel space and is unavailable to the applications. As such, the applications cannot access the encrypted data. In some examples, the kernel may provide a general error indicating that the data access command failed. In other examples, the kernel may provide more information as needed.

Figure 4:
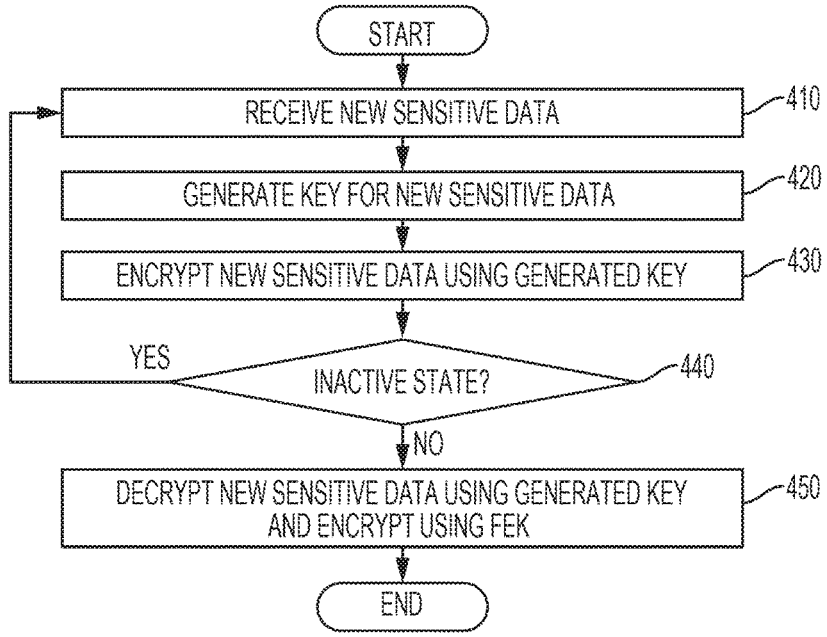
FIG. 4 is a flowchart of a method for encrypting and decrypting new sensitive data when a device is in a locked state according to an embodiment of the present disclosure.

FIG. 4 is a flowchart of a method of encrypting and decrypting new sensitive data when a device is in a locked state according to an embodiment of the present disclosure.

Referring to FIG. 4, a flowchart of a method of encrypting new sensitive data when the protected space is in a locked state is illustrated. In operation 410, the device receives new sensitive data. As noted above, the private key is unavailable when the device is in the locked state. Accordingly, the device cannot access the sensitive data to read or write to the sensitive data.

Accordingly, in operation 420, the device generates a key for the new sensitive data. The generated key may be stored in the kernel space and may not be accessible outside the kernel space. In operation 430, the device encrypts the new sensitive data using the generated key and stores the generated key in the kernel space. In operation 440, the device determines if the protected space has been unlocked and the FEK of the corresponding application is available. When the protected space remains in the locked state in operation 440, the device returns to operation 410 to receive and encrypt new sensitive data. When the device leaves the locked state in operation 440 (i.e., when the device is unlocked and the FEK of the application is unencrypted in operation 350), the device decrypts the new sensitive data using the temporary key and encrypts the new sensitive data using the FEK in operation 450.

Accordingly, this method allows an application to continue to receive sensitive data and write a separate file for that new data. When the device enters the unlocked state, the new sensitive data is merged with the old sensitive data, thereby enabling sensitive data to be received without providing any feedback to the application.

Figure 5:
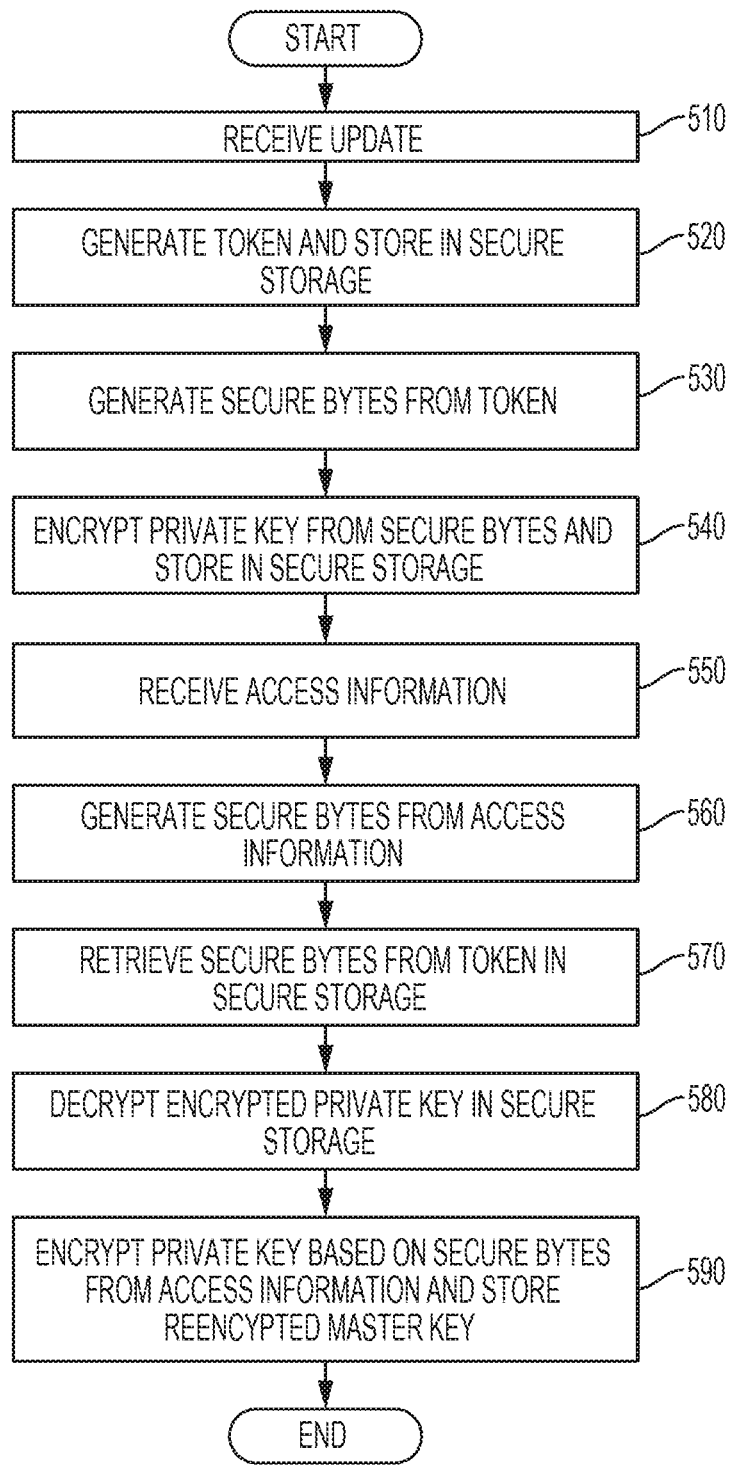
FIG. 5 is a flowchart of a method of migrating sensitive data according to an embodiment of the present disclosure.

FIG. 5 is a flowchart of a method of migrating sensitive data according to an embodiment of the present disclosure.

Referring to FIG. 5, data migration may occur in a mobile device due to, for example, performing an over the air (OTA) firmware update. The data migration may be needed to secure information such that data cannot be temporarily accessible. Accordingly, initially, the device receives an update for the device in operation 510. In operation 520, the device generates a token and stores the token in a secure storage location (e.g., TrustZone, etc.). The token is applied to a cryptographic library such as PBKDF2 to generate secure bytes based on the token in operation 530. Using the secure bytes, the private key for sensitive data is encrypted and stored in the secure storage location in operation 540. The operations 510 to 540 are automatically performed without a user's input.

In operation 550, the device receives access information from the user to unlock the device. As indicated above, the access information could be a password, biometric information, etc. After unlocking the device in operation 550, the device generates secure bytes from the access information in operation 560. In operation 570, the secure bytes associated with the token, which are stored in the secure storage location are retrieved. In operation 580, the encrypted private key, which is also stored in the secure storage location, is decrypted using the secure bytes associated with the token. In operation 590, a new private key is encrypted based on the secure bytes from the access information and then stored in the secure storage location.

Accordingly, the method described above provides key migration architecture that enables sensitive data to remain encrypted without an interruption by the user during software migration.

Figure 6:
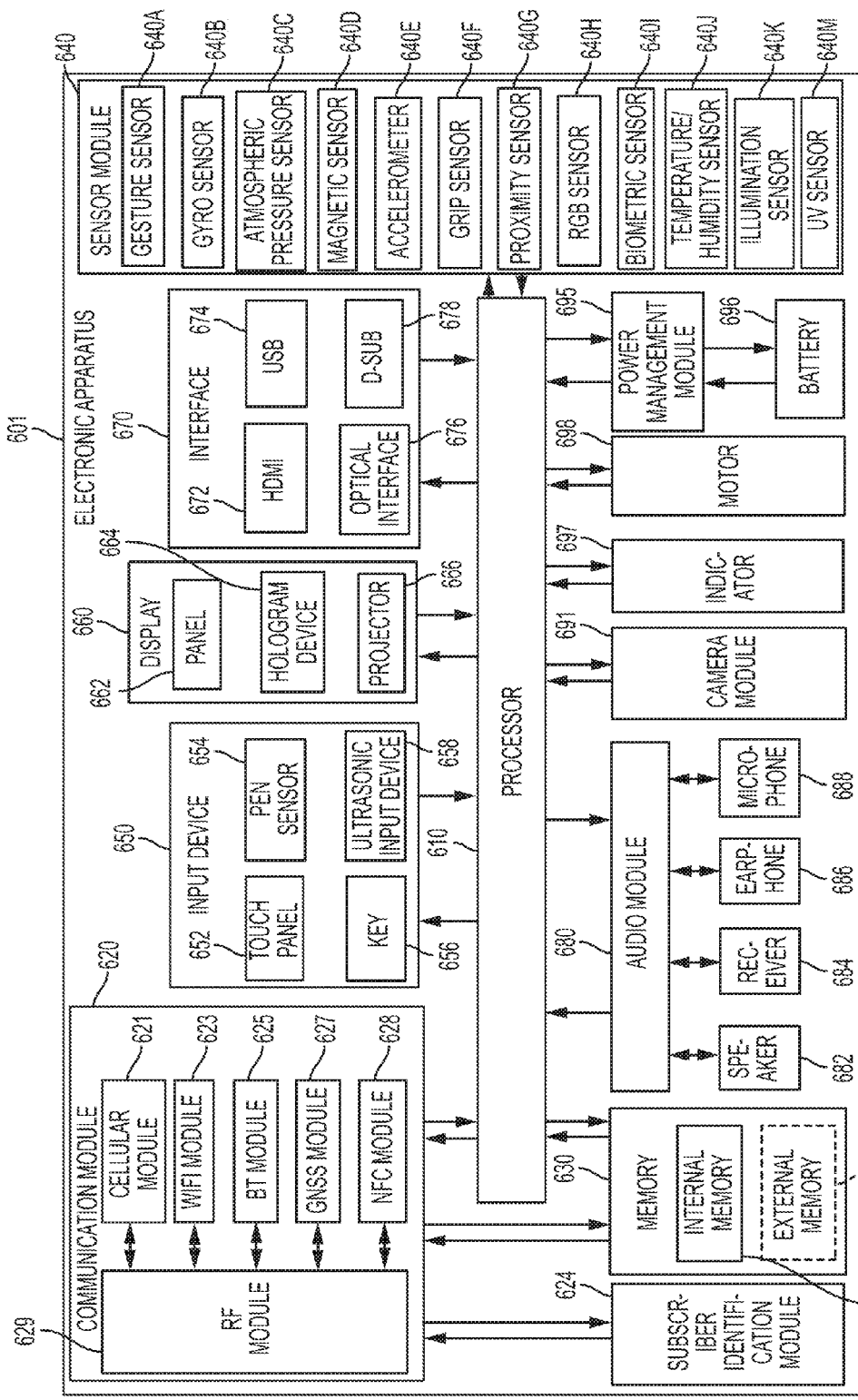
FIG. 6 is a block diagram of an electronic device according to various embodiments of the present disclosure.

FIG. 6 is a block diagram of an electronic device according to various embodiments of the present disclosure.

Referring to FIG. 6, an electronic device 601 may include at least one processor (for example, an application processor (AP)) 610, a communication module 620, a subscriber identification module (SIM) 624, a memory 630, a sensor module 640, an input device 650, a display 660, an interface 670, an audio module 680, a camera module 691, a power management module 695, a battery 696, an indicator 697, and a motor 698.

The processor 610 may, for example, control a plurality of hardware or software components that are connected to the processor 610 by executing an OS or an application program and may perform processing or computation on various types of data.

The processor 610 may be implemented, for example, as a system on chip (SoC). According to an embodiment of the present disclosure, the processor 610 may further include a graphics processing unit (GPU) and/or an image signal processor (ISP). The processor 610 may load a command or data received from at least one other component (for example, a non-volatile memory), process the loaded command or data, and store various types of data in the non-volatile memory.

The communication module 620 may include, for example, the cellular module 621, a wireless fidelity (Wi-Fi) module 623, a bluetooth (BT) module 625, a global navigation satellite system (GNSS) module 627 (for example, a global positioning system (GPS) module, a GLONASS module, a BeiDou module, or a Galileo module), an NFC module 628, and a radio frequency (RF) module 629.

The cellular module 621 may provide services such as voice call, video call, short message service (SMS), or an Internet service through a communication network. According to an embodiment of the present disclosure, the cellular module 621 may identify and authenticate the electronic device 601 within a communication network, using the SIM (for example, a SIM card) 624.

According to an embodiment of the present disclosure, the cellular module 621 may perform at least a part of the functionalities of the processor 610. According to an embodiment of the present disclosure, the cellular module 621 may include a CP.

Each of the Wi-Fi module 623, the BT module 625, the GNSS module 627, and the NFC module 628 may include, for example, a processor for processing data transmitted and received by the module. According to an embodiment of the present disclosure, at least a part (for example, two or more) of the cellular module 621, the Wi-Fi module 623, the BT module 625, the GNSS module 627, and the NFC module 628 may be included in a single integrated circuit (IC) or IC package.

The RF module 629 may transmit and receive, for example, communication signals (for example, RF signals). The RF module 629 may include, for example, a transceiver, a power amplifier module (PAM), a frequency filter, a low noise amplifier (LNA), an antenna, or the like. According to an embodiment of the present disclosure, at least one of the cellular module 621, the Wi-Fi module 623, the BT module 625, the GNSS module 627, and the NFC module 628 may transmit and receive RF signals via a separate RF module.

The SIM 624 may include, for example, a card including the SIM and/or an embedded SIM. The SIM 624 may include a unique identifier (for example, integrated circuit card identifier (ICCID)) or subscriber information (for example, international mobile subscriber identity (IMSI)).

The memory 630 may include, for example, an internal memory 632 or an external memory 634. The internal memory 632 may be at least one of, for example, a volatile memory (for example, dynamic random access memory (DRAM), static RAM (SRAM), or synchronous dynamic RAM (SDRAM)), and a non-volatile memory (for example, one time programmable read only memory (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state drive (SSD)).

The external memory 634 may further include, for example, a flash drive such as a compact flash (CF), a secure digital (SD), a micro-SD, a mini-SD, an extreme digital (xD), a multi-media card (MMC), or a memory stick. The external memory 634 may be operatively and/or physically coupled to the electronic device 601 via various interfaces.

The sensor module 640 may, for example, measure physical quantities or detect operational states associated with the electronic device 601, and convert the measured or detected information into electric signals. The sensor module 640 may include at least one of, for example, a gesture sensor 640A, a gyro sensor 640B, an atmospheric pressure sensor 640C, a magnetic sensor 640D, an accelerometer 640E, a grip sensor 640F, a proximity sensor 640G, a color sensor (for example, a red, green, blue (RGB) sensor) 640H, a biometric sensor 640I, a temperature/humidity sensor 640J, an illumination sensor 640k, and an ultra violet (UV) sensor 640M. Additionally or alternatively, the sensor module 640 may include, for example, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor. The sensor module 640 may further include a control circuit for controlling one or more sensors included therein. According to various embodiments, the electronic device 601 may further include a processor configured to control the sensor module 640, as a part of or separately from the processor 610. Thus, while the processor 610 is in a sleep state, the control circuit may control the sensor module 640.

The input device 650 may include, for example, a touch panel 652, a (digital) pen sensor 654, a key 656, or an ultrasonic input device 658. The touch panel 652 may operate in at least one of, for example, capacitive, resistive, infrared, and ultrasonic schemes. The touch panel 652 may further include a control circuit. The touch panel 652 may further include a tactile layer to thereby provide haptic feedback to the user.

The (digital) pen sensor 654 may include, for example, a detection sheet which is a part of the touch panel or separately configured from the touch panel. The key 656 may include, for example, a physical button, an optical key, or a keypad. The ultrasonic input device 658 may identify data by detecting, using a microphone (for example, a microphone 688), ultrasonic signals generated from an input tool.

The display 660 may include a panel 662, a hologram device 664, or a projector 666. The panel 662 may be configured to be, for example, flexible, transparent, or wearable. The panel 662 and the touch panel 652 may be implemented as a single module. According to an embodiment of the present disclosure, the panel 662 may include a pressure sensor (or a force sensor) for measuring the force of the pressure of a user touch. The pressure sensor may be integrated with the touch panel 652 or may include one or more sensors, separately from the touch panel 652. The hologram device 664 may utilize the interference of light waves to provide a three-dimensional image in empty space. The projector 666 may provide an image by projecting light on a screen. The screen may be positioned, for example, inside or outside the electronic device 601. According to an embodiment of the present disclosure, the display 660 may further include a control circuit for controlling the panel 662, the hologram device 664, or the projector 666.

The interface 670 may include, for example, an HDMI 672, a USB 674, an optical interface 676, or a D-subminiature (D-sub) 678. Additionally or alternatively, the interface 670 may include, for example, a mobile high-definition link (MHL) interface, an SD/multimedia card (MMC) interface, or an infrared data association (IrDA) interface.

The audio module 680 may convert a sound to an electrical signal, and vice versa. The audio module 680 may process sound information input into, or output from, for example, a speaker 682, a receiver 684, an earphone 686, or the microphone 688.

The camera module 691 may capture, for example, still images and a video. According to an embodiment of the present disclosure, the camera module 691 may include one or more image sensors (for example, a front sensor or a rear sensor), a lens, an ISP, or a flash (for example, a light emitting diode (LED) or a xenon lamp).

The power management module 695 may manage, for example, power of the electronic device 601. According to an embodiment of the present disclosure, the power management module 695 may include a power management IC (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may use additional circuits for wireless charging, such as a coil loop, a resonance circuit, or a rectifier. The battery fuel gauge may measure, for example, a charge level, a voltage while charging, current, or temperature of the battery 696. The battery 696 may include, for example, a rechargeable battery and/or a solar battery.

The indicator 697 may indicate specific states of the electronic device 601 or a part of the electronic device 601 (for example, the processor 610), for example, boot status, message status, or charge status. The motor 698 may convert an electrical signal into a mechanical vibration and generate vibrations or a haptic effect. While not shown, the electronic device 601 may include a processing device for supporting mobile TV (for example, a GPU). The processing device for supporting mobile TV may process media data compliant with, for example, digital multimedia broadcasting (DMB), digital video broadcasting (DVB), or MediaFLO.

Each of the above-described components of the electronic device may include one or more parts and the name of the component may vary with the type of the electronic device. According to various embodiments, the electronic device may be configured to include at least one of the afore-described components. Some component may be omitted from or added to the electronic device. According to various embodiments, one entity may be configured by combining a part of the components of the electronic device, to thereby perform the same functions of the components prior to the combining.

Figure 7:
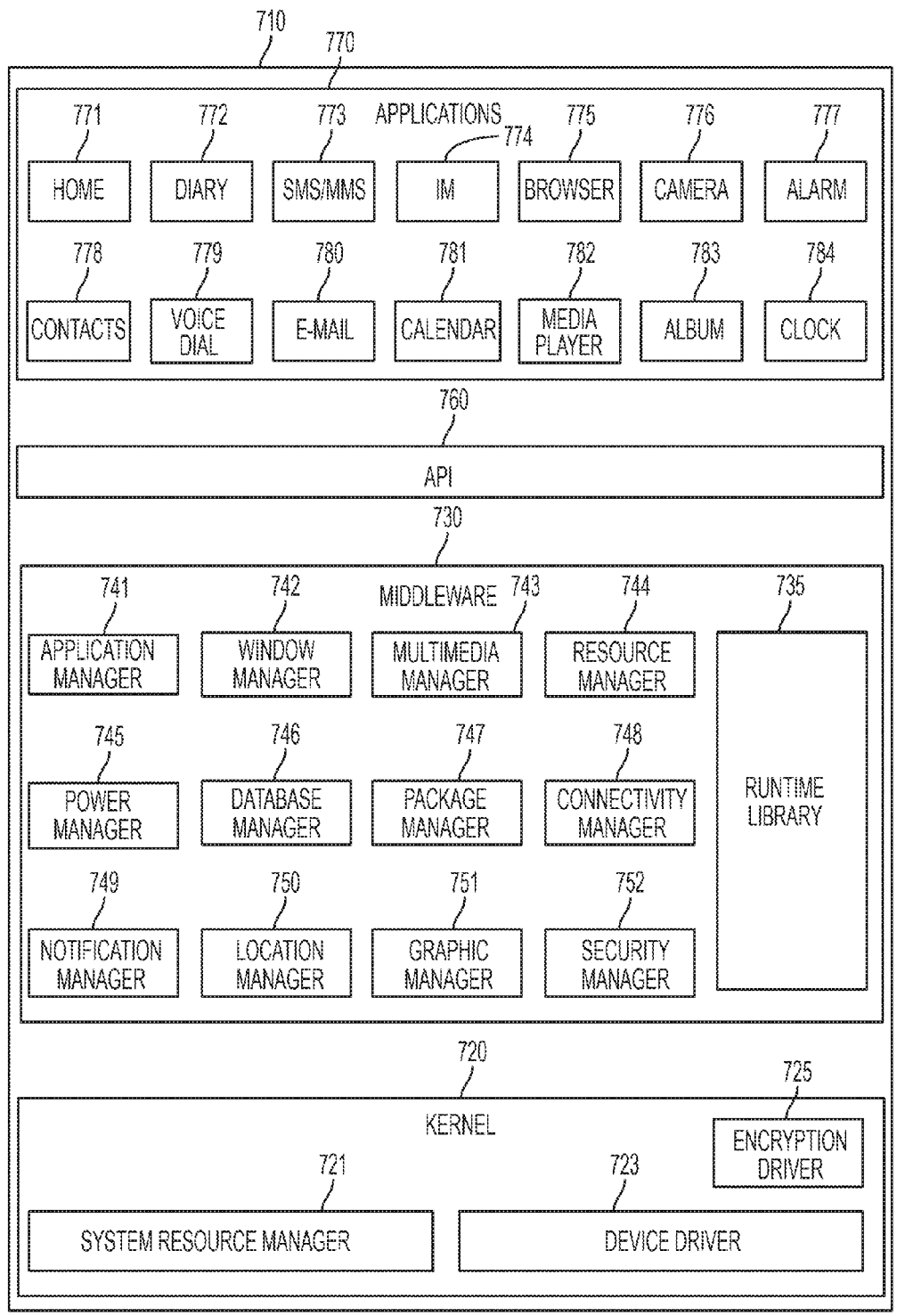
FIG. 7 is a block diagram of a programming module according to various embodiments of the present disclosure.

FIG. 7 is a block diagram of a programming module according to various embodiments of the present disclosure.

Referring to FIG. 7, according to an embodiment of the present disclosure, a programming module 710 may include an OS that controls resources related to an electronic device (for example, the electronic device 701) and/or various applications executed on the OS (for example, the application programs 747). For example, the OS may be Android®, iOS®, Windows®, Symbian®, Tizen®, Bada®, or the like.

The programming module 710 may include a kernel 720, middleware 730, an API 760, and/or applications 770. At least a part of the programming module 710 may be preloaded on the electronic device or downloaded from an external electronic device.

The kernel 720 may include, for example, a system resource manager 721, a device driver 723, and/or an encryption driver 725. The system resource manager 721 may control, allocate, or deallocate system resources. According to an embodiment of the present disclosure, the system resource manager 721 may include a processor manager, a memory manager, or a file system manager. The device driver 723 may include, for example, a display driver, a camera driver, a BT driver, a shared memory driver, a USB driver, a keypad driver, a Wi-Fi driver, an audio driver, or an inter-process communication (IPC) driver. The encryption driver 725 may receive data associated with data commands (e.g., read, write, etc.) and use the state of the device to encrypt and decrypt corresponding data. For example, when sensitive data is requested to be accessed for a read operation, the encryption driver 725 may deny access to that data if the device or the protected space is in a locked state. The encryption driver 725 securely stores various information such that various different applications, middleware, or programming interfaces are unable to access the encryption information. The encryption driver 725 may also enable other applications to receive information to enable the applications to securely perform the corresponding data command.

The middleware 730 may, for example, provide a function required commonly for the applications 770 or provide various functionalities to the applications 770 through the API 760 so that the applications 770 may efficiently use limited system resources available within the electronic device. According to an embodiment of the present disclosure, the middleware 730 may include at least one of a runtime library 735, an application manager 741, a window manager 742, a multimedia manager 743, a resource manager 744, a power manager 745, a database manager 746, a package manager 747, a connectivity manager 748, a notification manager 749, a location manager 750, a graphic manager 751, or a security manager 752.

The runtime library 735 may include, for example, a library module that a complier uses to add a new function in a programming language during execution of an application 770. The runtime library 735 may perform I/O management, cryptographic functions, memory management, a function related to arithmetic function, or the like. For example, the runtime library 735 may implement at a symmetric cryptographic library, an asymmetric cryptographic library, and so forth to securely store information in the file system.

The application manager 741 may manage, for example, the life cycle of at least one of the applications 770. The window manager 742 may manage graphical user interface (GUI) resources used for a screen. The multimedia manager 743 may determine formats required to play back various media files and may encode or decode a media file using a coder/decoder (CODEC) suitable for the format of the media file. The resource manager 744 may manage resources such as a source code of at least one application 770, a memory, or storage space.

The power manager 745 may, for example, manage a battery or a power source by operating in conjunction with a basic input/output system (BIOS) and may provide power information required for an operation of the electronic device. The database manager 746 may manage a database for at least one of the applications 770 so that the database may be generated, searched, or modified. The package manager 747 may manage installation or update of an application distributed as a package file.

The connectivity manager 748 may manage, for example, wireless connectivity of Wi-Fi, BT, or the like. The notification manager 749 may indicate or notify an event such as message arrival, a schedule, a proximity alarm, or the like in a manner that does not bother a user. The location manager 750 may mange location information about the electronic device. The graphic manager 751 may manage graphical effects to be provided to the user or related user interfaces. The security manager 752 may provide an overall security function required for system security, user authentication, and the like. The security manager 752 may include a certificated cryptographic library that performs cryptographic functions to secure data while executing in an application space. In an embodiment of the present disclosure, if the electronic device (for example, the electronic device 601) has a telephony function, the middleware 730 may further include a telephony manager to manage a voice or video call function of the electronic device.

A new middleware module may be created and used by combining various functions of the above-described component modules in the middleware 730. The middleware 730 may provide a customized module for each OS type in order to provide differentiated functions. In addition, the middleware 730 may dynamically delete a part of the existing components or add a new component.

The API 760 is, for example, a set of API programming functions, which may be configured differently according to an OS. For example, in the case of Android or iOS, one API set may be provided per platform, whereas in the case of Tizen, two or more API sets may be provided per platform.

The applications 770 may include, for example, one or more applications capable of providing functions such as home 771, dialer 772, SMS/multimedia messaging service (MMS) 773, instant message (IM) 774, browser 775, camera 776, alarm 777, contacts 778, voice dial 779, email 780, calendar 781, media player 782, album 783, or clock 784, health care (for example, measurement of an exercise amount or a glucose level), or providing of environment information (for example, information about atmospheric pressure, humidity, or temperature).

According to an embodiment of the present disclosure, the applications 770 may include an application (for the convenience of description, referred to as 'information exchange application') supporting information exchange between the electronic device (for example, the electronic device 601) and an external electronic device. The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device. Also, the notification relay application may, for example, receive notification information from the external electronic device and transmit the received notification information to a user.

The device management application may, for example, manage (for example, install, delete, or update) at least a part of functions of the external electronic device communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment of the present disclosure, the applications 770 may include an application (for example, a health care application) designated according to a property (for example, the type of the electronic device as a property of the electronic device is a mobile medical device) of the external electronic device. According to an embodiment of the present disclosure, the applications 770 may include an application received from an external electronic device. According to an embodiment of the present disclosure, the applications 770 may include a preloaded application or a third party application downloadable from a server. The names of components of the programming module 710 according to embodiment of the present disclosure may vary according to the type of an OS.

According to various embodiments, at least a part of the programming module 710 may be implemented in software, firmware, hardware, or a combination of at least two of them. At least a part of the programming module 710 may be implemented (for example, executed) by the processor (for example, the processor 610). At least a part of the programming module 710 may include, for example, a module, a program, a routine, a set of instructions, or a process to execute one or more functions.

As is apparent from the forgoing description, a method and an electronic device for encrypting and decrypting data be provided according to various embodiments of the present disclosure.

The term "module" as used herein may include its ordinary meaning including, for example, a unit of one, or a combination of two or more of hardware, software, and firmware. The term "module" may be used interchangeably with terms such as, for example, unit, logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific IC (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor, one or more processors may execute functions corresponding to the commands. The computer-readable storage medium may be, for example, the memory 630.

The computer-readable medium may include hard disk, floppy disk, magnetic media (for example, magnetic tape), optical media (for example, compact disc ROM (CD-ROM)), DVD, magneto-optical media (for example, floptical disk), hardware devices (for example, ROM, RAM or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added. The embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for encrypting and decrypting data in a device, the method comprising:
   transmitting a data command from an application to an encryption driver that executes in a kernel space;
   determining if the application is authenticated to perform the data command based on an access policy;
   transmitting, when the application is authenticated, a first key to a cryptographic library that executes in an application space;
   determining if the data command corresponds to a write command to write encrypted data or a read command to read encrypted data; and
   performing the data command based on the first key after receiving a response from a response via the cryptographic library,
   wherein, if the data command corresponds to a write command, the first key corresponds to a public key, and
   wherein, if the data command corresponds to a read command, the first key corresponds to a private key.

2. The method of claim 1, further comprising:
   if the data command corresponds to the read command, determining if the first key is available,
   wherein the first key is unavailable when in a locked state and is available when in an unlocked state.

3. The method of claim 2, further comprising:
   if the data command corresponds to the write command, determining if the data command corresponds to a command to write sensitive data while in a locked state;
   if the data command corresponds to the command to write the sensitive data while in the locked state, generating a second key and encrypting the sensitive data using the second key;
   in response to transitioning from the locked state to the unlocked state, decrypting the encrypted sensitive data; and
   merging the sensitive data with related sensitive data.

4. The method of claim 2, further comprising:
   when in the locked state, receiving access information to transition from the locked state to the unlocked state;
   determining if the access information is sufficient to enter the unlocked state; and
   if the access information is sufficient to enter the unlocked state, unlocking the device and generating the private key based on the access information.

5. The method of claim 4, further comprising:
   in response to a command to transition from the unlocked state to the locked state, discarding the private key and cache entries related to the private key.

6. The method of claim 1,
   wherein the transmitting of the first key to the cryptographic library comprises:
      transmitting the first key from the encryption driver to a library connector that executes in the application space, and
      transmitting the first key from the library connector to the cryptographic library; and
   wherein the transmitting of the response from the cryptographic library to the encryption driver comprises:
      transmitting the response from the cryptographic library to the library connector, and
      transmitting the response from the library connector to the encryption driver.

7. The method of claim 1, further comprising:
   transmitting a device encryption key (DEK) and an encrypted DEK to the application,
   wherein the application performs the data command based on the DEK and the encrypted DEK.

8. The method of claim 1, wherein the access policy is determined by an owner of the device.

9. A device for encrypting and decrypting data stored therein, the apparatus comprising:
   a memory; and
   a processor configured to:
      transmit a data command from an application to an encryption driver that executes in a kernel space,
      determine if the application is authenticated to perform the data command based on an access policy,
      transmit, when the application is authenticated, a first key to a cryptographic library that executes in an application space, and
      determine if the data command corresponds to a write command to write encrypted data or a read command to read encrypted data, and perform the data command based on the first key after receiving a response via the cryptographic library,
wherein, if the data command corresponds to a write command, the first key corresponds to a public key, and
wherein, if the data command corresponds to a read command, the first key corresponds to a private key.

10. The device of claim 9,
wherein the processor is further configured to determine if the first key is available when the data command corresponds to the read command, and
wherein the first key is unavailable when in a locked state and is available when in an unlocked state.

11. The device of claim 10, wherein the processor is further configured to:
if the data command corresponds to the write command, determine if the data command corresponds to a command to write sensitive data while the device is in a locked state;
if the data command corresponds to the command to write the sensitive data while the device is in the locked state, generate a second key and encrypting the sensitive data using the second key;
in response to transitioning from the locked state to the unlocked state, decrypt the encrypted sensitive data; and
merge the sensitive data with related sensitive data.

12. The device of claim 10, wherein the processor is further configured to:
when in the locked state, receive access information to unlock the device from the locked state to the unlocked state;
determine if the access information is sufficient to enter the unlocked state; and
if the access information is sufficient to enter the unlocked state, transition to the unlocked state and generate the private key based on the access information.

13. The device of claim 12, wherein the processor is further configured to discard the private key and cache entries related to the private key in response to a command to transition from the unlocked state to the locked state.

14. The device of claim 9,
wherein, when transmitting of the first key to the cryptographic library, the processor is further configured to:
transmit the first key from the encryption driver to a library connector that executes in the application space, and
transmitting the first key from the library connector to the cryptographic library, and
wherein, when transmitting of the response from the cryptographic library to the encryption driver, the processor is further configured to:
transmit the response from the cryptographic library to the library connector, and
transmit the response from the library connector to the encryption driver.

15. The device of claim 9,
wherein the processor is further configured to transmit a device encryption key (DEK) and an encrypted DEK to the application, and
wherein the application performs the data command based on the DEK and the encrypted DEK.

16. The device of claim 9, wherein the access policy is determined by an owner of the device.

17. A non-transitory computer-readable storage medium storing instructions that, when executed, cause at least one processor to:
transmit a data command from an application to an encryption driver that executes in a kernel space;
determine if the application is authenticated to perform the data command based on an access policy;
transmit, when the application is authenticated, a first key to a cryptographic library that executes in an application space;
determine if the data command corresponds to a write command to write encrypted data or a read command to read encrypted data; and
perform the data command based on the first key after receiving a response via the cryptographic library,
wherein, if the data command corresponds to a write command, the first key corresponds to a public key, and
wherein, if the data command corresponds to a read command, the first key corresponds to a private key.

18. The non-transitory computer-readable storage medium of claim 17, wherein the cryptographic library includes a certificate from a security source indicating that the cryptographic library meets security requirements of the security source.

* * * * *